(12) United States Patent
Kepinski et al.

(10) Patent No.: US 11,077,974 B2
(45) Date of Patent: Aug. 3, 2021

(54) SYSTEMS AND METHODS FOR FORMING DUAL LAYER WATER SOLUBLE PACKETS

(71) Applicant: MULTI-PACK CHICAGO LLC, Mt. Prospect, IL (US)

(72) Inventors: Andreas Kepinski, Mt. Prospect, IL (US); Thomas McLenithan, Mt. Prospect, IL (US)

(73) Assignee: Multi-Pack Chicago LLC, Mt. Prospect, IL (US)

( * ) Notice: Subject to any disclaimer, the term of this patent is extended or adjusted under 35 U.S.C. 154(b) by 3 days.

(21) Appl. No.: 16/397,300

(22) Filed: Apr. 29, 2019

(65) Prior Publication Data

US 2019/0248527 A1 Aug. 15, 2019

Related U.S. Application Data

(63) Continuation of application No. 14/921,766, filed on Oct. 23, 2015, now Pat. No. 10,273,027.

(Continued)

(51) Int. Cl.
*B65B 47/10* (2006.01)
*B65B 41/12* (2006.01)
(Continued)

(52) U.S. Cl.
CPC .......... *B65B 47/10* (2013.01); *B65B 1/02* (2013.01); *B65B 9/042* (2013.01); *B65B 37/005* (2013.01);
(Continued)

(58) Field of Classification Search
CPC ....... B65B 47/10; B65B 41/12; B65B 37/005; B65B 55/24; B65B 57/02; B65B 61/02; B65B 1/02; B65B 1/12; B65B 9/042; B65B 2009/047; B65B 47/00; B65B 47/08; B65B 41/16; B65B 37/02; B29K 2029/04; B29K 2105/256; B29K 2995/0062; B29K 2105/251; B29L 2031/712; B65D 81/20; B65D 81/2007; B65D 81/2023
See application file for complete search history.

(56) References Cited

U.S. PATENT DOCUMENTS

| 3,057,127 A | 10/1962 | Gex et al. |
|---|---|---|
| 3,208,192 A | 9/1965 | Schaefer |

(Continued)

FOREIGN PATENT DOCUMENTS

| CA | 2446071 A1 | 11/2020 |
|---|---|---|
| EP | 1059139 A1 | 6/2000 |

(Continued)

OTHER PUBLICATIONS

U.S. Appl. No. 14/179,878 Office Action dated Jan. 26, 2017; (18 pages).

(Continued)

*Primary Examiner* — David J Walczak
(74) *Attorney, Agent, or Firm* — Reed Smith LLP; Nina Habib Borders

(57) ABSTRACT

A method of forming dual layer water soluble packets includes drawing a base film into a cavity of a mold, drawing air through openings in the base film, metering an amount of a first product of a first color onto the base film in the cavity, metering an amount of a second product of a second color onto the amount of the first product, and, sealing a lid film to the base film.

21 Claims, 11 Drawing Sheets

Related U.S. Application Data

(60) Provisional application No. 62/068,348, filed on Oct. 24, 2014.

(51) Int. Cl.

| | | |
|---|---|---|
| *B65B 55/24* | (2006.01) | |
| *B65B 9/20* | (2012.01) | |
| *B65B 37/00* | (2006.01) | |
| *B65B 57/02* | (2006.01) | |
| *B65B 61/02* | (2006.01) | |
| *B65B 1/02* | (2006.01) | |
| *B65B 1/12* | (2006.01) | |
| *B65B 9/04* | (2006.01) | |
| *B29L 31/00* | (2006.01) | |
| *B29K 29/00* | (2006.01) | |
| *B29K 105/00* | (2006.01) | |

(52) U.S. Cl.
CPC .............. *B65B 55/24* (2013.01); *B65B 57/02* (2013.01); *B65B 61/02* (2013.01); *B29K 2029/04* (2013.01); *B29K 2105/256* (2013.01); *B29K 2995/0062* (2013.01); *B29L 2031/712* (2013.01); *B65B 2009/047* (2013.01)

(56) References Cited

U.S. PATENT DOCUMENTS

| | | |
|---|---|---|
| 3,218,776 A | 11/1965 | Cloud |
| 4,257,530 A | 3/1981 | Faller |
| 4,302,654 A | 11/1981 | Bennett et al. |
| 4,414,051 A | 11/1983 | Bose |
| 4,437,294 A | 3/1984 | Romagnoli |
| 4,490,203 A | 12/1984 | Bose |
| 4,507,535 A | 3/1985 | Bennett et al. |
| 4,513,015 A | 4/1985 | Clough |
| 4,568,815 A | 2/1986 | Kimbara |
| 4,571,924 A | 2/1986 | Bahrani |
| 4,683,702 A | 8/1987 | Vis |
| 4,743,123 A | 5/1988 | Legters et al. |
| 4,815,603 A | 3/1989 | Harris |
| 5,012,629 A | 5/1991 | Rehman et al. |
| 5,030,314 A | 7/1991 | Lang |
| 5,049,720 A | 9/1991 | Fang et al. |
| 5,081,819 A | 1/1992 | Cloud |
| 5,087,805 A | 2/1992 | Silverschotz et al. |
| 5,225,649 A | 7/1993 | Andreoli et al. |
| 5,229,180 A | 7/1993 | Littmann |
| 5,336,554 A | 8/1994 | Knight |
| 5,382,773 A | 1/1995 | Kurihara et al. |
| 5,404,889 A | 4/1995 | Belvederi et al. |
| 5,496,253 A | 3/1996 | Snellman et al. |
| 5,534,178 A | 7/1996 | Bailly et al. |
| 5,919,122 A | 7/1999 | Geiger et al. |
| 6,101,685 A | 8/2000 | Archibald et al. |
| 6,120,817 A | 9/2000 | Archibald et al. |
| 6,126,975 A | 10/2000 | Archibald et al. |
| 6,132,780 A | 10/2000 | Archibald et al. |
| 6,207,925 B1 | 3/2001 | Kendall |
| 6,325,068 B1 | 12/2001 | Dombek et al. |
| 6,441,340 B1 | 8/2002 | Varriano-Marston |
| 6,945,017 B1 | 9/2005 | Bonney et al. |
| 7,127,874 B2 | 10/2006 | Viltro et al. |
| 7,214,173 B2 | 5/2007 | Barclay et al. |
| 7,386,971 B2 | 6/2008 | Catlin et al. |
| 7,543,708 B2 | 6/2009 | Doyle et al. |
| 7,661,248 B2 | 2/2010 | Conti |
| 7,723,656 B1 | 5/2010 | Angelos |
| 8,112,974 B1 | 2/2012 | Angelos |
| 8,156,713 B2 | 4/2012 | Catlin et al. |
| 8,250,837 B2 | 8/2012 | Catlin et al. |
| 8,485,347 B2 | 7/2013 | Jackels |
| 2003/0104912 A1 | 6/2003 | Baggot et al. |
| 2004/0144681 A1 | 7/2004 | Wiedemann et al. |
| 2004/0173496 A1 | 9/2004 | Srinivasan |
| 2005/0049129 A1 | 3/2005 | Belcastro et al. |
| 2005/0115935 A1 | 6/2005 | Edwards et al. |
| 2006/0021695 A1 | 2/2006 | Blessing et al. |
| 2008/0128315 A1 | 6/2008 | Buevich et al. |
| 2008/0152767 A1 | 6/2008 | Maisel |
| 2008/0296196 A1 | 12/2008 | Duffield et al. |
| 2009/0008820 A1 | 1/2009 | Duffield et al. |
| 2009/0142638 A1 | 6/2009 | Katayama |
| 2009/0226573 A1 | 9/2009 | Leon et al. |
| 2009/0253016 A1 | 10/2009 | Katayama |
| 2009/0288367 A1 | 11/2009 | Granili et al. |
| 2010/0016137 A1 | 1/2010 | Benedetti et al. |
| 2010/0021534 A1 | 1/2010 | Duffield et al. |
| 2011/0016834 A1 | 1/2011 | Rapparini |
| 2011/0150371 A1 | 6/2011 | Bosman et al. |
| 2011/0250241 A1 | 10/2011 | Duffield et al. |
| 2012/0159718 A1 | 6/2012 | Catlin et al. |
| 2012/0288660 A1 | 11/2012 | Maseiker et al. |

FOREIGN PATENT DOCUMENTS

| | | |
|---|---|---|
| EP | 1434715 | 7/2004 |
| FR | 2873992 B1 | 10/2020 |
| WO | 2003 062085 A1 | 7/2003 |
| WO | 2006 063609 A1 | 6/2006 |
| WO | 2007 095986 A2 | 8/2007 |
| WO | 2011 061628 A1 | 5/2011 |
| WO | 2011 151245 A1 | 12/2011 |

OTHER PUBLICATIONS

U.S. Appl. No. 14/179,878 Office Action dated Nov. 2, 2017; (18 pages).
U.S. Appl. No. 14/179,878 Office Action dated May 16, 2018; (19 pages).
Office Action for CA application No. 2,842,774 dated Oct. 19, 2019.
Office Action for CA application No. 2,842,774 dated Jun. 25, 2020.
U.S. Appl. No. 14/179,878 Office Action dated May 14, 2020.
U.S. Appl. No. 14/179,878 Office Action dated Nov. 24, 2020.

SYSTEMS AND METHODS FOR FORMING DUAL LAYER WATER SOLUBLE PACKETS

CROSS REFERENCE TO RELATED APPLICATION

This application is a continuation of U.S. patent application Ser. No. 14/921,766, filed Oct. 23, 2015, now U.S. Pat. No. 10,273,027, which claims the benefit of U.S. Provisional Patent Application 62/068,348 filed Oct. 24, 2014, which is hereby incorporated by reference.

FIELD OF INVENTION

The present invention relates to systems and methods for forming dual layer water soluble packets.

BACKGROUND OF INVENTION

Water soluble packets, also commonly referred to as pouches or sachets, provide a single dose of a product in one convenient unit. The water soluble packets include a water soluble film sealed around a pre-measured amount of the product. During exposure or contact with water, the film dissolves and the product mixes with the water. The water soluble packets provide many benefits to the consumer. The water soluble packets are pre-measured, and thus avoid any measuring by the consumer. The product is contained by the film, and is not prone to spilling.

The water soluble packets are commonly used with dishwasher and laundry detergents. During a wash cycle, the water soluble film dissolves when exposed to the wash water allowing the detergent to mix with the wash liquid. The water soluble packets may also be used in any of a variety of different applications and contain any of a variety of different products. For example, herbicides, fertilizers, lawn chemicals, rinse-aids, cleaners, etc. may all be sealed within the water soluble packets.

Conventional water soluble packets are formed by using machines, such as drums, flat-bed platen, or other endless or non-endless belt systems, having rows of cavities on its exterior surface. A base or bottom layer of film, such as a polyvinyl alcohol (PVA) film, is applied over the cavities. The base layer of film forms receptacles in the cavities to receive the product. A specified amount of the product is next metered onto the base layer of film. A lid or an upper layer of film, such as additional PVA film, is then sealed over the base layer of the film. The product is now sealed inside of a combination of the base layer and the lid layer of films. Rows and rows of water soluble packets are formed as part of a continuous process. Individual water soluble packets are cut from the rows of water soluble packets. Such processes and equipment are described in U.S. Pat. No. 3,218,776, which is hereby incorporated by reference.

SUMMARY OF INVENTION

Systems and methods for forming dual layer water soluble packets are herein described. Layers of film contain several layers of powder to form the packets. The several layers of powder form the dual layer of powder in the packets. Packet forming assemblies and methods are described for producing the dual layer water soluble packets from multiple cavities. The packet forming assemblies include drums, flat-bed platen, and/or other endless or non-endless belt systems that include the multiple cavities that form the packets.

The systems and methods form openings in a base layer of the film. A vacuum draws ambient air through the openings, while the layers of powder are deposited onto the base layer of film. The vacuum generally holds the powder in position. The layers of powder of different colors are deposited onto the base layer of the film and/or on top of previously deposited layers of powder. By depositing the powder while the vacuum is applying the vacuum through the openings, denser and more compacted layers of the powders are formed. The packets formed by the systems and methods herein have a distinct boundary between the layers of powder and exhibit a firmer and harder feeling. The water soluble packets formed herein are not generally pliable and do not exhibit a loose feel common to conventional water soluble packets. The packets formed by the systems and methods herein exhibit improved cosmetic properties, which may be attractive to consumers. The different layers of powder are less likely to blend or mix together. This provides the packet with the distinctive boundary between the different colored powders, which is less prone to blending.

The openings are formed in the base layer of the film. The vacuum force is applied simultaneously with the depositing of the different layers of powder. Typically, a first color of powder is deposited onto the base layer of film under vacuum. Next, a second color of the powder is deposited over the first color of powder under vacuum. The vacuum pulls air through the layers of powder compressing them.

The openings may be formed using a variety of different techniques. For example, a laser may forms the openings in the base layer of film. The laser burns or cuts the openings into the base layer of the water soluble film that forms the water soluble packet. For example, a water mist may be applied to the base layer. The water mist dissolves portions of the base layer to form the openings. For example, a mechanical roller with piercing members, such as pins, or other mechanical piercing apparatus may form the openings in the base layer.

The openings may include holes, perforations, voids, vents, etc. in the film. The openings permit air to be drawn by the vacuum through the base layer of film and through the layers of product. The water soluble packets are packed more tightly with the product.

The use of the laser provides several advantages. The laser openings do not discolor the entire film of the water soluble packet. Second, the laser openings do not make the water soluble packets sticky, which can be a problem associated with the use of the water mist.

During the manufacturing process, the product is filled into cavities of a packet forming assembly, which are lined with a base layer of the film. After the filling, a lid layer of film is sealed to the base layer over the product.

The laser may be configured to form the openings at any of a variety of stages during the industrial manufacture of the water soluble packets. The laser may form the openings at a pre-fill stage in the manufacturing process of the water soluble packets. In a first pre-fill process, the laser forms the openings after the base film is positioned over or drawn into the cavities of the packet forming assembly and before adding the product to the cavities. In a second pre-fill process, the laser forms the openings before the base film is positioned over the cavities. For example, the laser forms the openings in the base film as the base film is unrolled.

The openings are formed as part of a continuous manufacturing process, i.e., the openings are formed while the film is moving. Typically, the films or water soluble packets are not intermittently stopped in order to form the openings with the laser. As such, the methods and systems do not slow down production rates of the water soluble packets. The systems and methods described herein may be integrated into both rotary and horizontal form fill machines.

In an aspect, a method of forming dual layer water soluble packets is described. The method includes drawing a base film into a cavity of a mold. The method includes drawing air through openings in the base film. The method includes metering an amount of a first product onto the base film in the cavity. The method includes metering an amount of a second product of a second material which may or may not be of a different color onto the amount of the first product. The method includes sealing a lid film to the base film.

In another aspect, a method of forming dual layer water soluble packets is described. The method includes drawing a base film into a cavity of a packet forming assembly. The method includes forming one or more openings in the base film with a laser. The method includes vacuuming air through the openings in the base film. The method includes metering an amount of a first product onto an upper side of the base film in the cavity while applying a vacuum to a lower side of the base film. The method includes metering an amount of a second product onto the amount of the first product while applying the vacuum to the lower side of the base film.

In another aspect, a method of forming dual layer water soluble packets is described. The method includes forming openings in the base film. The method includes drawing the base film into a cavity of a mold. The method includes depositing an amount of a first product of a first color onto a first side of the base film in the cavity while applying a suction force to a second side of the base film. The method includes depositing an amount of a second product of a second color onto the amount of the first product while applying the suction force to the second side of the base film. The method includes sealing a lid film to the base film.

In another aspect, a system to form dual layer water soluble packets is described. The system includes a rotating drum operatively engaged to a motor for rotating the drum. The drum includes one or more of cavities. A base film supply roll supplies a base film to the drum to cover the one or more cavities. A laser forms openings in the base film. A vacuum draws air through the openings. A first feed hopper supplies a first conveyor with a first product. The first conveyor meters an amount of the first product into the one or more cavities over the base film. A second feed hopper supplies a second conveyor with a second product. The second conveyor meters an amount of the second product into the one or more cavities over the amount of the first product. A lid film supply roll supplies a lid film to the cavities.

In another aspect, a system to form dual layer water soluble packets is described. The system includes a rotating drum operatively engaged to a motor for rotating the drum. The drum includes one or more cavities. A base film supply roll supplies a base film to the drum to cover the one or more cavities. A mechanical piercing member forms openings in the base layer. A vacuum draws air through the openings. A first feed hopper supplies a first conveyor with a first product. The first conveyor meters an amount of the first product into the one or more cavities over the base film. A second feed hopper supplies a second conveyor with a second product. The second conveyor meters an amount of the second product into the one or more cavities over the amount of the first product. A lid film supply roll supplies a lid film to the cavities.

In another aspect, a system to form dual layer water soluble packets is described. The system includes a rotating drum operatively engaged to a motor for rotating the drum. The drum includes one or more cavities. The cavities are in an exterior surface of the rotating drum. A base film supply roll supplies a base film to the drum to cover the one or more cavities. A water sprayer dissolves openings in the base film. A vacuum to draws air through the openings. A first feed hopper supplies a first conveyor with a first product. The first conveyor meters an amount of the first product into the one or more cavities over the base film. A second feed hopper supplies a second conveyor with a second product. The second conveyor meters an amount of the second product into the one or more cavities over the amount of the first product. A lid film supply roll supplies a lid film to the cavities.

In another aspect, a system to form dual layer water soluble packets is described. The system includes a plurality of cavities operatively engaged to a motor for moving the cavities. A base film supply roll supplies a base film to cover the plurality of more cavities. The system includes a water sprayer, a laser or mechanical piercing member to form openings in the base film. A vacuum draws air through the openings. A first product feeder meters an amount of a first product into the plurality of cavities over the base film. A second product feeder meters an amount of a second product into the plurality over the amount of the first product. A lid film supply roll supplies a lid film to the plurality of cavities. The first feeder and the second feeder may include an auger feed system that directs product into the cavities. The first feeder and the second feeder may also include multiple hoppers supplying multiple conveyor belts that deposit the product into the cavities. The system may include a drum, a belt, a flat-bed, or platens that move the cavities.

DETAILED DESCRIPTION OF INVENTION

Figure 1:
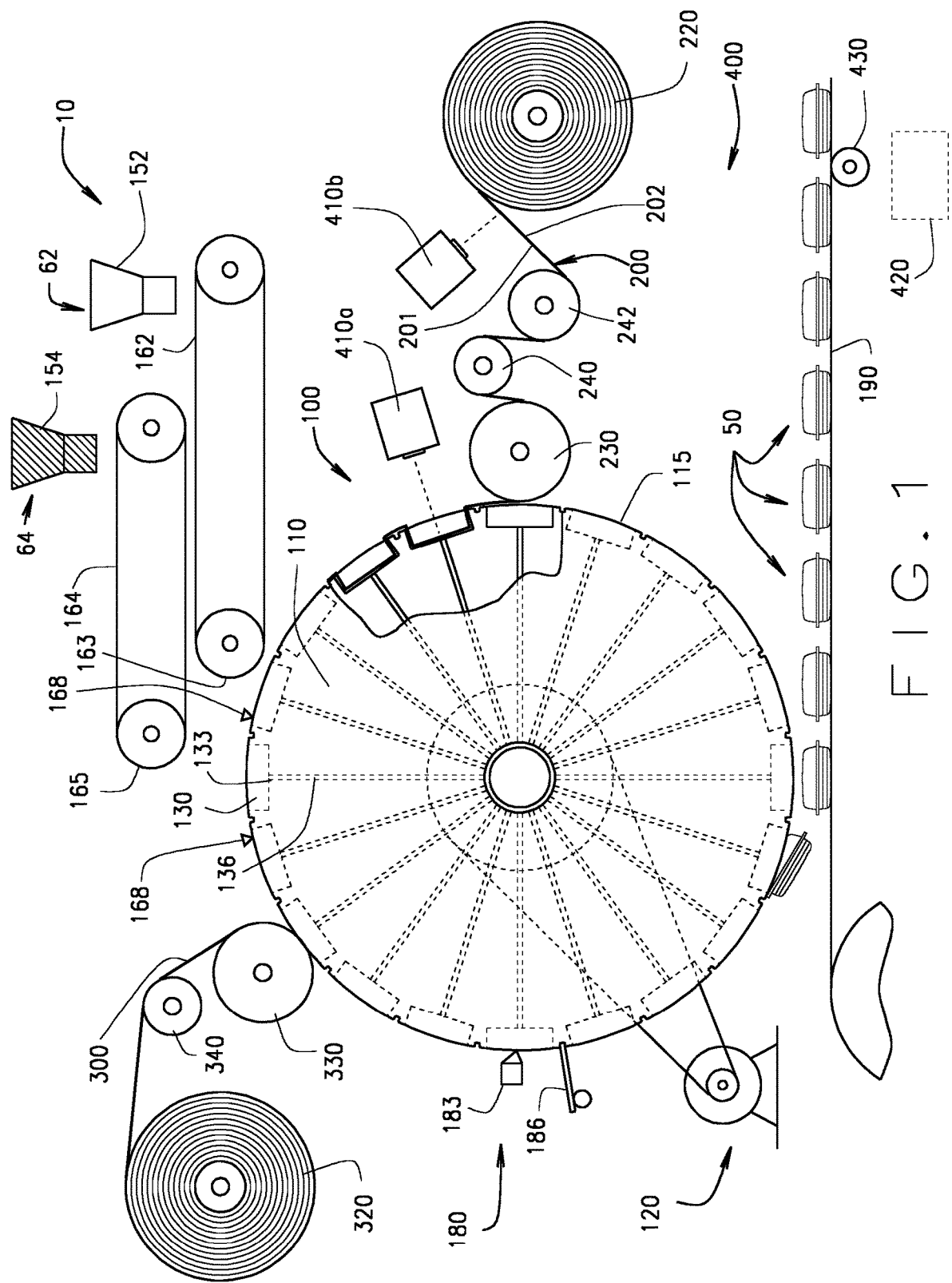
FIG. 1 is a schematic view of the system to form the dual layer water soluble packets using the laser.
Figure 8A:
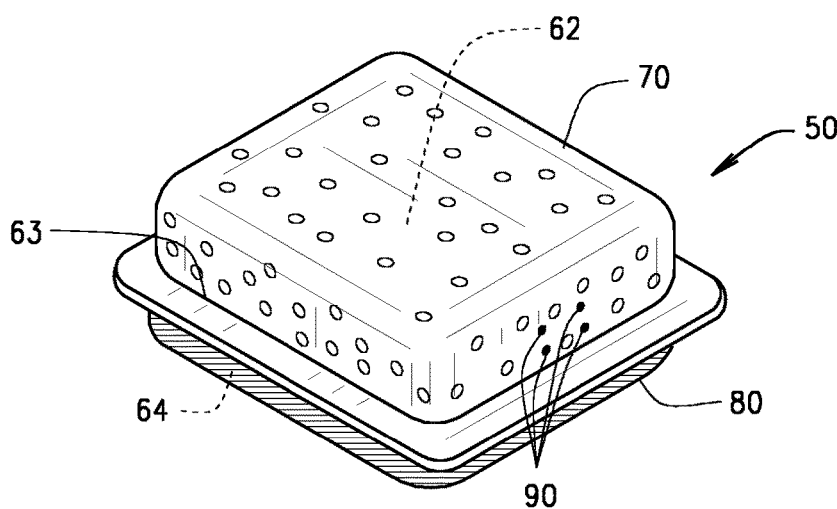
FIG. 8A is a perspective view of the dual layer packet.
Figure 8B:
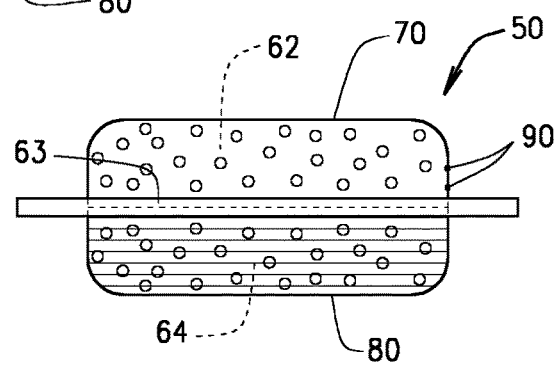
FIG. 8B is a side view of the dual layer packet.
Figure 9:
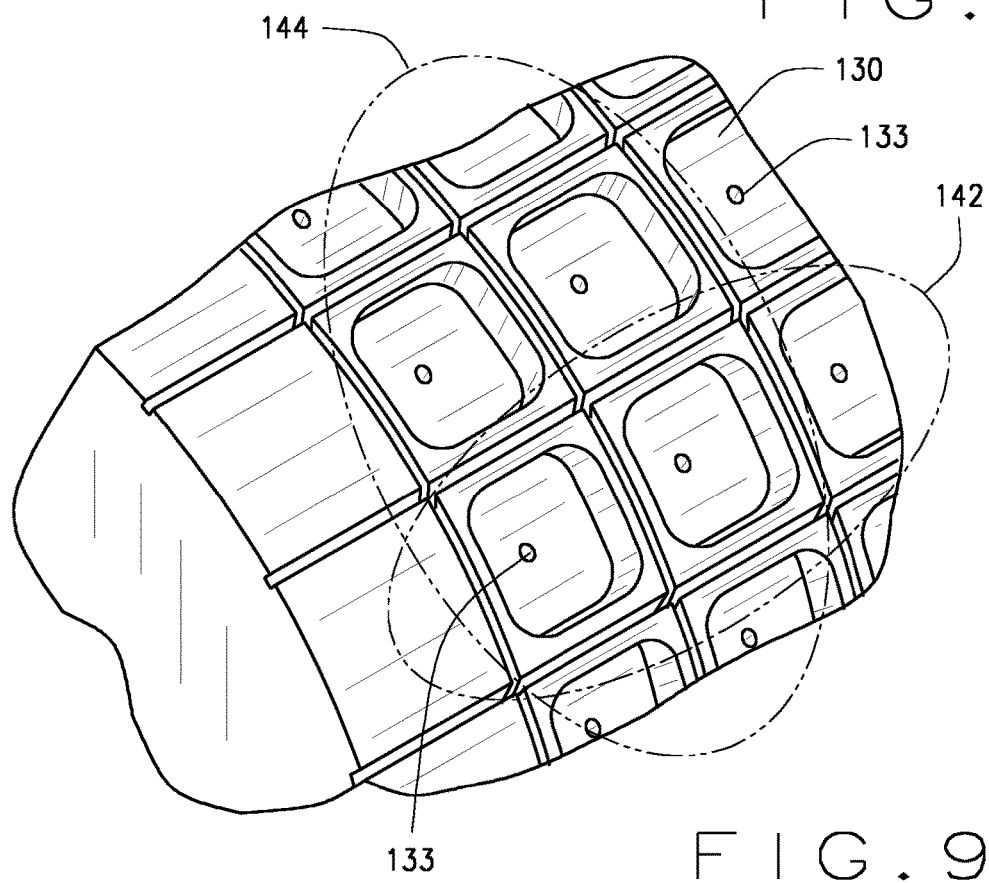
FIG. 9 is a view of the cavities and the vacuum openings in the cavities.

FIG. 1 is a schematic view of a dual layer water soluble packet forming system 10, which is used to form dual layer water soluble packets 50. An example of the dual water soluble packet 50 is shown in FIGS. 8A and 8B. The system 10 forms openings 90 in a base film 200 and/or a base layer 70 of the water soluble packets 50. As described below, the base layer 70 is formed from the base film 200.

Figure 5:
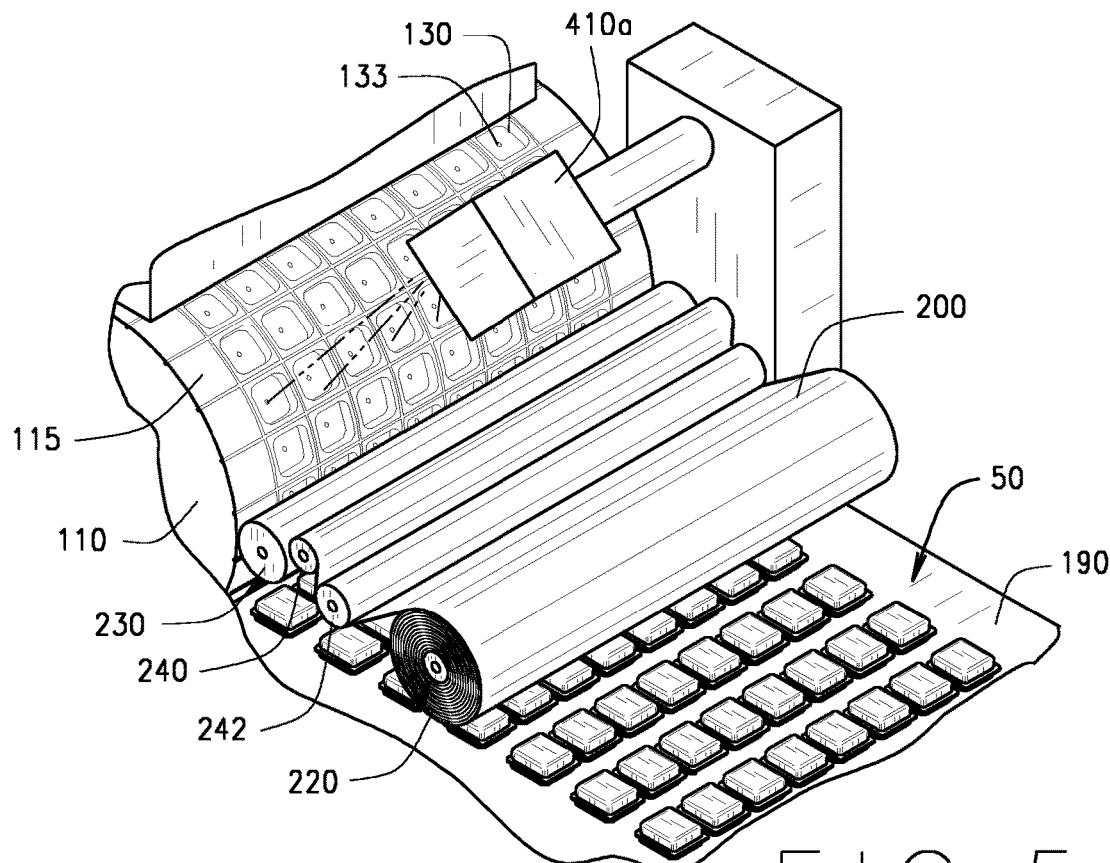
FIG. 5 is a perspective view of the system to form the dual layer water soluble packets with the laser forming openings in the base layer of film in the cavities.
Figure 6:
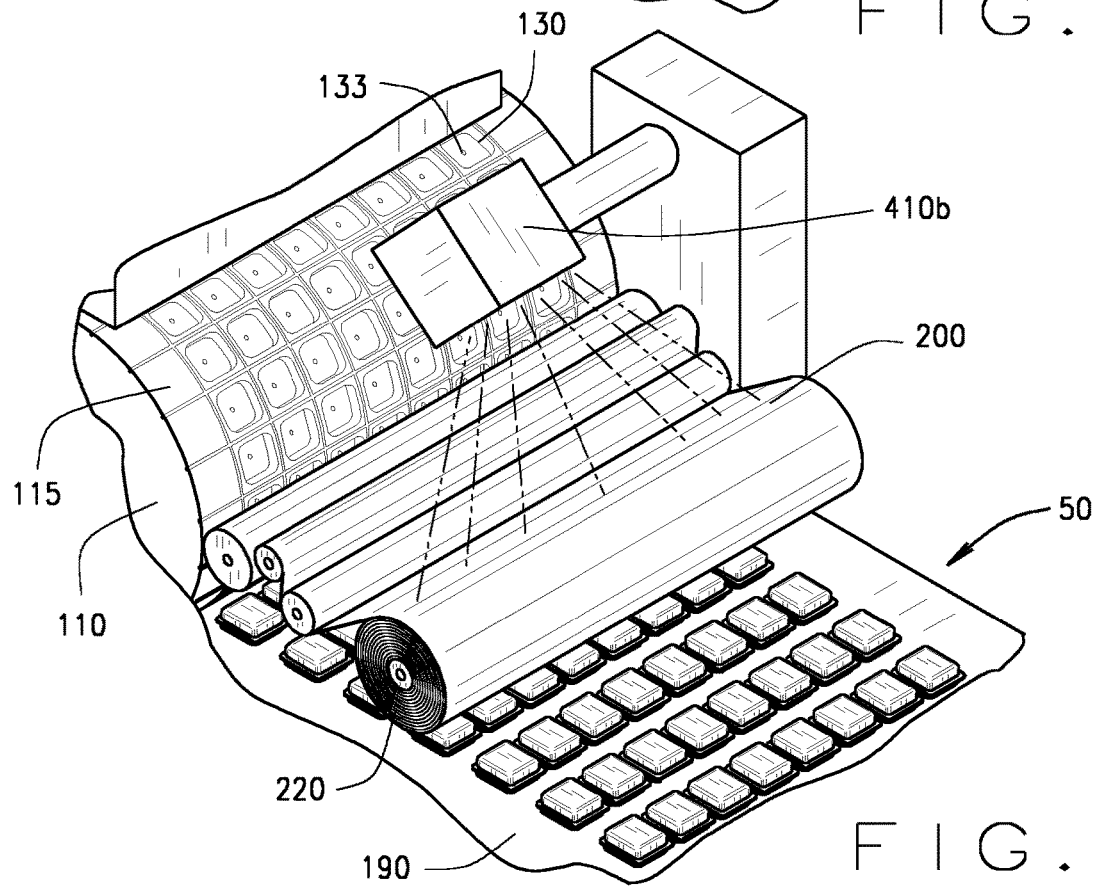
FIG. 6 is a perspective view of the system to form dual layer water soluble packets with the laser forming openings in the base layer of film coming off of the supply roll.

In FIGS. 1, 5, and 6, the openings 90 are formed by a laser 410a or a laser 410b. The laser 410a/410b may be positioned at any of a number of different alternate positions about the system 10. For example, the laser 410a forms the openings 90 after the base film 200 is over a drum 110. For example, the laser 410b forms the openings 90 in the base film 200 before the base film 200 reaches the drum 110. Although the drum 110 is shown, the laser 410a/410b may be incorporated into other packet forming assemblies that use an endless belt, a flat-bed arrangement, or platens that move cavities that form the packets.

Figure 2:
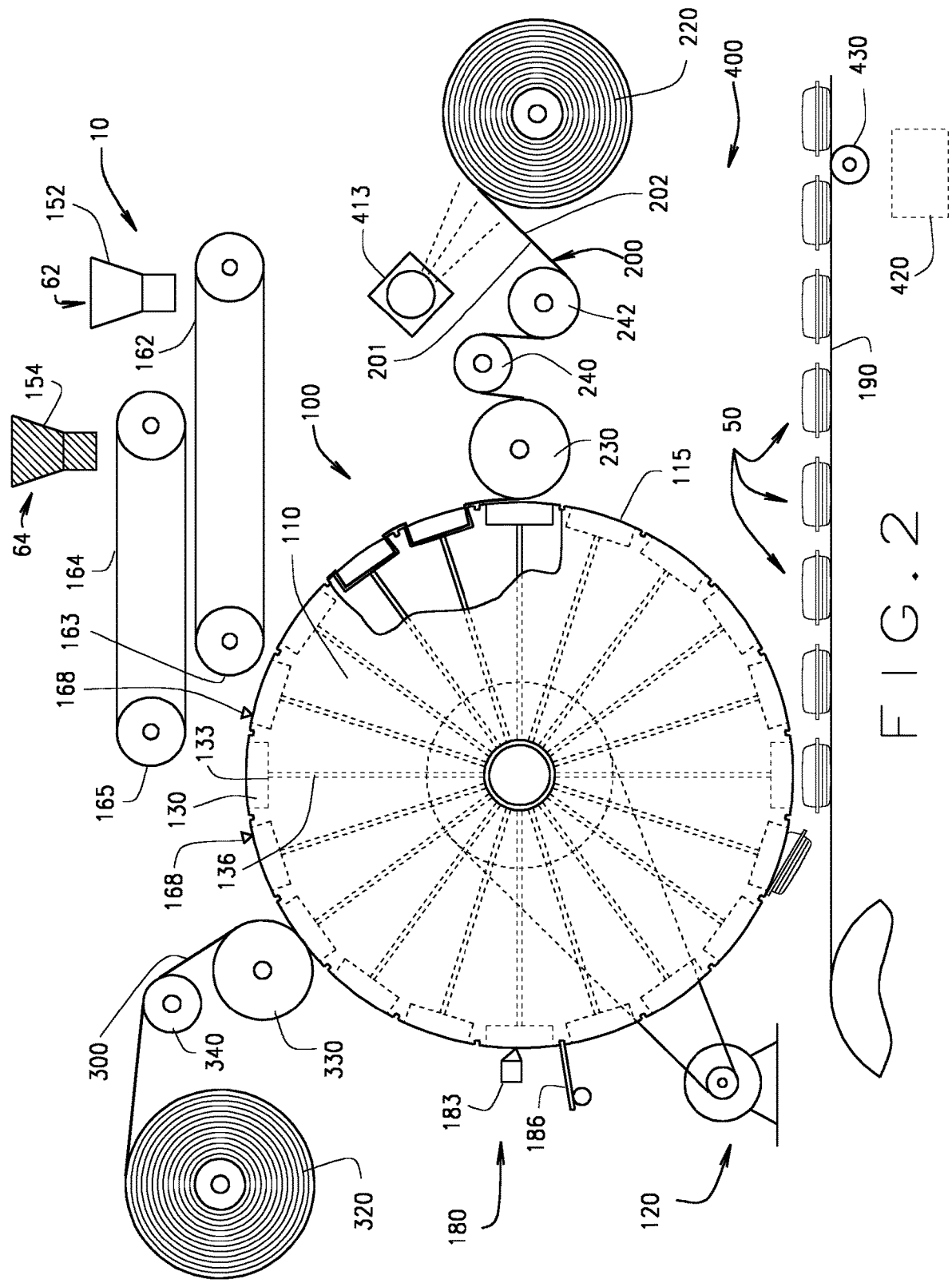
FIG. 2 is a schematic view of the system to form the dual layer water soluble packets using the sprayer.
Figure 7:
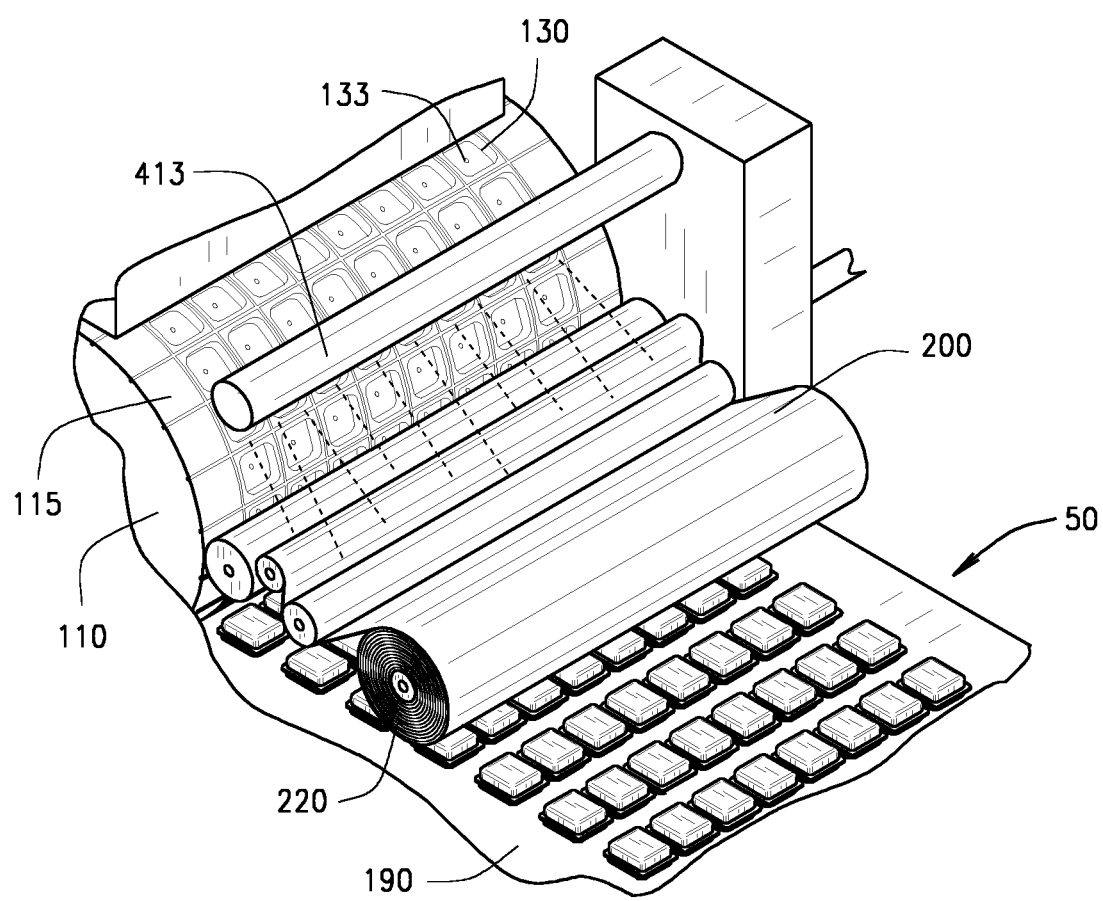
FIG. 7 is a perspective view of the system to form the dual layer water soluble packets using the sprayer to form the openings.

In FIGS. 2 and 7, the openings 90 are formed by a sprayer 413, which sprays a water mist onto the base layer 70. The water mist dissolves the base layer 70 to form the openings 90. The sprayer 413 may include a spray bar with one or more nozzles. The sprayer 413 may include any of a variety of nozzles, dispensers, or misters that emit fluid. The sprayer 413 may also spray other solvents or solutions that dissolve the openings 90 into the base layer 70.

Figure 3:
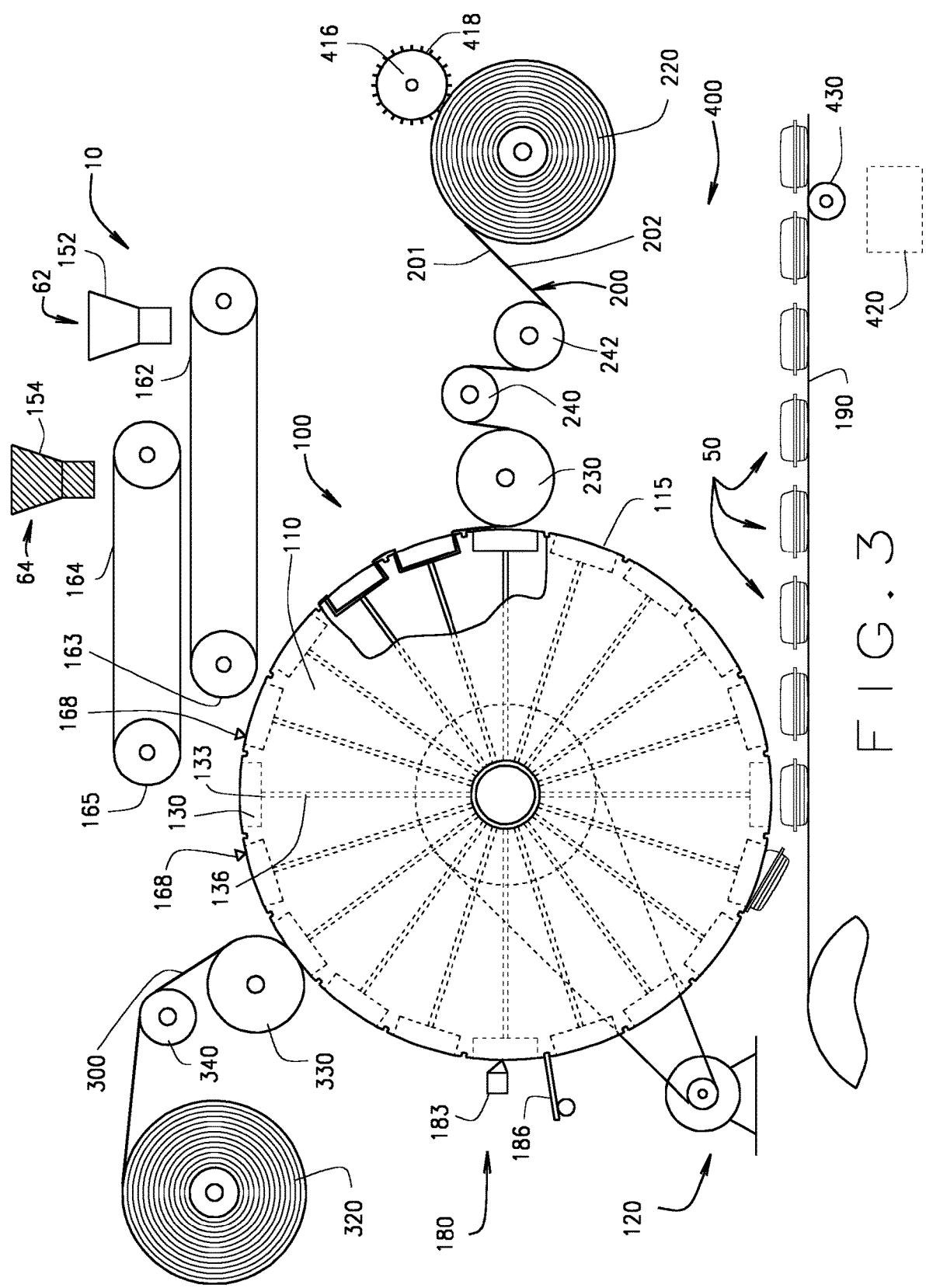
FIG. 3 is a schematic view of the system to form the dual layer water soluble packets using the piercing member.

In FIG. 3, the openings 90 are formed by a mechanical piercing member. For example, the mechanical piercing member may include a roller 416 with a plurality of pins 418 that physically poke the openings 90 into the base film 200.

The water soluble packets 50 include a first product 62 and a second product 64 sealed between the base layer 70 and a lid layer 80. The first product 62 and the second product 64 may include cleaning agents of different colors. For example, the first product 62 may have a whitish color and the second product 64 may have a bluish color. Of course, any different or similar colored cleaning agents may be used for the first product 62 and the second product 64.

The base layer 70 is formed from the base film 200, while the lid layer 80 is formed from a lid film 300. The openings 90 include holes, perforations, voids, vents, etc. in the base layer 70. As described below, the laser 410a/410b may direct its pulses at the base film 200.

Figure 4:
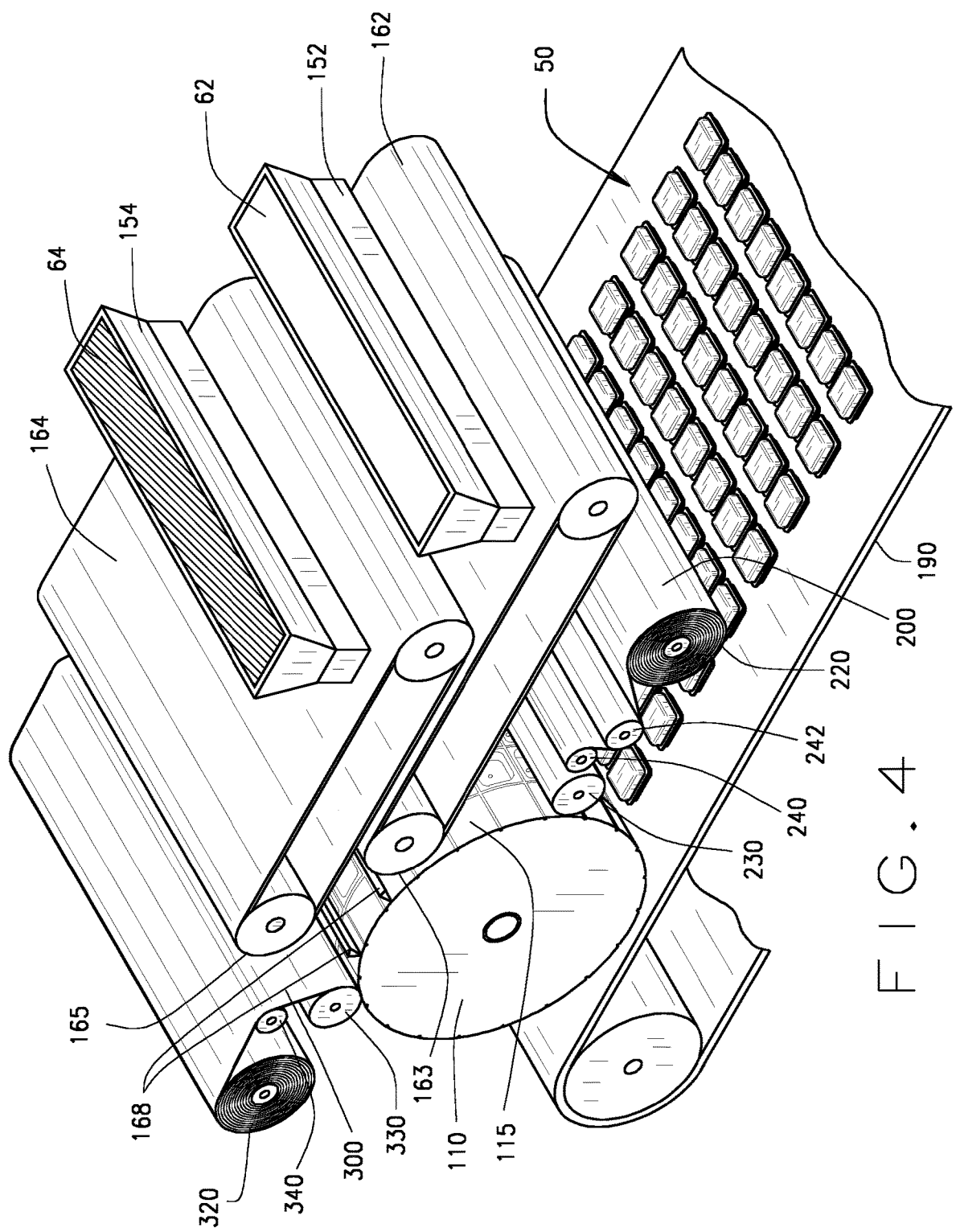
FIG. 4 is a perspective view of the system to form dual layer water soluble packets.

FIG. 4 is a perspective view of a packet forming assembly 100, which includes a rotating drum 110 operatively engaged to a motor 120 for rotation of the drum 110. The packet forming assembly 100 forms the water soluble packets 50. The drum 110 includes a plurality of cavities 130. The packet forming assembly 100 may also include flat-bed platen and/or other endless belt systems instead of the drum 110. The flat-bed platen and/or other endless belt systems also include a plurality of cavities 130 to form the water soluble packets 50.

A bulk amount of the first product 62 is placed in a first feed hopper 152, which is generally positioned above a first conveyor 162. A bulk amount of the second product 64 is placed in a second feed hopper 154, which is generally positioned above a second conveyor 164. The first feed hopper 152 supplies the first conveyor 162 with the first product 62. The first conveyor 162 deposits the first product 62 into the cavities 130 on top of the base film 200. The second feed hopper 154 supplies the second conveyor 164 with the second product 64. The second conveyor 164 deposits the second product 64 over the first product 62. The first conveyor 162 and the second conveyor 164 are in a staggered arrangement. For example, an end 163 of the first conveyor 162 may be positioned, for example, at an approximately 1 o'clock position, while an end 165 of the second conveyor 164 may be positioned, for example, at an approximately 12 o'clock position with respect to the drum 110. Wipers 168 are positioned between the conveyors 162 and 164 to remove and/or clear extra product from the drum 110 in order improve sealing.

As the drum 110 rotates, the first conveyor 162 meters an amount of the first product 62 into the cavities 130 on top of the base film 200. As the drum 110 further rotates, the cavities 130 containing the first product 62 are positioned under the end 165 of the second conveyor 164, which meters an amount of the second product 64 into the cavities 130 on top of the first product 62. As such, the second product 64 is layered over the first product 62. The second product 64 may fully cover, partially cover, or substantially cover the first product 62. Generally, the second product 64 will be metered or deposited in an amount sufficient to fully cover the first product 62, such that two distinct layers are formed in the water soluble packets 50. Next, the lid film 300 is sealed to the base film 200, and the water soluble packets 50 are separated.

In greater detail, the base film 200 is directed to the drum 110 from the base film supply roll 220. A base film roller 230 presses the base film 200 against a surface 115 of the drum 110. The base film 200 generally covers a plurality of the cavities 130. Guide rollers 240 and 242 assist in directing and transferring the base film 200 to the drum 110.

The lid film 300 is directed to the drum 110 from the lid film supply roll 320. A lid film roller 330 presses the lid film 300 against the base film 200 to cover the first product 62 and the second product 64 in base film 200 lining the cavities 130. A guide roller 340 assists in directing and transferring the lid film 300 to the drum 110.

The drum 110 includes multiple rows 142 of the cavities 130. Generally, the surface 115 of the drum 110 is covered with the cavities 130. The laser 410a may simultaneously pulse groups 144 of the cavities 130. The groups 144 may cover multiple rows 142 of the cavities 130.

With reference to FIGS. 1-3, each of the cavities 130 includes a vacuum opening 133 that is in fluidic communication with a vacuum passage 136. The packet forming assembly 100 draws a vacuum through the vacuum passage 136 and the vacuum opening 133. The packet forming assembly 100 draws a vacuum through the opening 133 and through the openings 90 of the base film 200. The vacuum pulls and/or draws the first product 62 and the second product 64 against the base film 200. The vacuum pulls and/or draws air through the openings 90, the first product 62, and/or the second product 64.

With reference to FIG. 1, the packet forming assembly 100 includes a cutting assembly 180 to separate the water soluble packets 50 from each other. The cutting assembly 180 may include a vertical cutter 183 to make vertical separation cuts and a horizontal cutter 186 to make horizontal separation cuts. After the water soluble packets 50 are separated, the drum 110 drops the water soluble packets 50 onto a take away conveyor 190.

With continued reference to FIG. 1, a laser assembly 400 includes the laser 410a and/or the laser 410b to form the openings 90 in the base film 200. The laser assembly 400 also includes a controller 420 and an encoder 430. The controller 420 and the encoder 430 register and time the pulses from the laser 410a/410b to strike the base layer 70 or the base film 200 at the appropriate interval and time.

The laser 410a/410b may be integrated with the packet forming assembly 100 in any of a variety of configurations or positions. The laser 410a may form the openings 90, as shown in FIG. 5, after the base film 200 is over the cavities 130. The laser 410b, as shown in FIG. 6, may form the openings 90 in the base film 200 before base film 200 reaches the drum 110.

With reference to FIG. 5, the openings 90 are formed when the base film 200 is over or drawn into the cavities 130. The openings 90 are formed at a pre-fill stage. The laser 410a forms the openings 90 in the base film 200, while the base film 200 is positioned over the drum 110 or after the base film 200 has been drawn into the cavities 130 by the vacuum. In this aspect, the openings 90 are formed before the products 62 and 64 are added to the base film 200. The laser 410a is positioned proximate to the drum 110, and the laser 410a is focused toward the individual cavities 130 of the drum 110. The drum 110 provides the vacuum through the vacuum passage 136 that conforms the base film 200 to the drum 110 and into the individual cavities 130. Air is drawn into the vacuum passage 136 through the vacuum opening 133 in the bottom of the cavity 130. The vacuum draws and stretches the base film 200 into the individual cavities 130. The base film 200 forms a receptacle shape in the individual cavities 130 to receive the products 62 and 64. Before the products 62 and 64 are added to the base film 200 positioned in the cavities 130, the laser 410a forms the openings 90 in the base film 200. Notably, the openings 90 are formed by the laser 410a after the base film 200 has been stretched into the cavities 130 by the vacuum of the drum 110. The openings 90 are formed in the base film 200 after the base film 200 has been stretched, so the openings 90 will generally maintain their dimension as the base film 200 is not generally further stretched during the formation of the water soluble packet 50.

In this aspect, the vacuum is also drawing air through the openings 90 in the film, which sucks the products 62 and 64 against the base film 200. The products 62 and 64 are deposited on the base film 200 in the cavities 130 while the vacuum force is drawing the base film 200 into the cavity 130 and air is passing through the openings 90 and into the vacuum opening 133. This assists in increasing the density of the products 62 and 64 within the packet 50. The products 62 and 64, in the water soluble packets 50, are more tightly packed and less likely to mix as compared to conventional packets. A boundary 63 is more defined between the products 62 and 64. Without the openings 90 and the drawing of air through the openings 90 by the vacuum, the water soluble packet 50 will have a softer feel and the products 62 and 64 will be more loosely contained in the water soluble packet 50 and are more prone to mix—resulting in a less distinct boundary between the different colors.

With reference to FIGS. 8A and 8B, an example of the packet 50 is shown. The base layer 70 (formed from the base film 200) includes the one or more openings 90. First, the product 62 was metered onto an upper side 201 of the base film 200 while applying a vacuum to a lower side 202 of the base film 200. The second product 64 was metered onto the first product 62 while the vacuum was applied to the lower side 202 of the base film 200. The boundary 63 separates the products 62 and 64.

With reference to FIG. 6, the openings 90 in the base film 200 are formed before base film 200 reaches the drum 110. The openings 90 are formed at the pre-fill stage. The laser 410b forms openings 90 in the base film 200 that forms the packet 50. The laser 410b is positioned to form openings 90 in the base film 200 before the base film 200 reaches the drum 110. The laser 410b is positioned proximate to the base film supply roll 220. As the sheet of the base film 200 is unrolled and directed to the drum 110, the laser 410b may form the openings 90. One or more lasers 410b may be configured to intermittently form openings 90 in the entire width of the base film 200 used to cover the cavities 130. In this aspect, the openings 90 are formed before the products 62 and 64 are added to the base film 200 and before the base film 200 and the lid film 300 are sealed together. The openings 90 may be formed in portions of the base film 200 which will become the sides or a periphery of the finished water soluble packet 50. These areas of the base film 200 are subjected to less stretching than the areas of the base film 200 film which will become the central portions of the water soluble packet 50. By forming the openings 90 at the sides or periphery, the openings 90 are not generally stretched during the filling process, and the openings 90 maintain their desired shape.

The laser 410a/410b will now be described. The laser 410a/410b forms one or more openings 90 in the base film 200 forming the water soluble packet 50. In some aspects, the laser 410a/410b is programmed to form four openings 90 in each water soluble packet 50. The openings 90 may have various sizes and shapes. For example, the openings 90 may have a size up to approximately 1000 um. The openings 90 should be sized to allow air to be pulled through the openings 90, but not allow powder to leak out.

The system 10, laser assembly 400, and/or the processes described herein may be incorporated into water soluble packet forming systems and equipment from Cloud Packaging Solutions of Des Plaines, Ill. Such equipment is commercially available under the tradename HYDROFORMA.

The laser 410a/410b may be configured to provide enough power to generally only cut the openings 90 into the base film 200. The pulses will not damage the cavities 130, belts, rollers, or other components of the water soluble packet forming system 10. Although the laser 410a/410b will not hurt a worker with incidental, momentary exposure to the laser 410a/410b, the system 10 and its equipment may be provided with a protective shield and/or barriers to prevent accidental exposure of workers to the laser 410a/410b.

The laser assembly 400 also includes the controller 420 and the encoder 430. Existing water soluble packet forming systems may be retrofitted to include the laser assembly 400. The laser 410a/410b may be electronically linked to the controller 420, which registers the pulses from the laser 410a/410b with the moving base film 200. The encoder 430 may measure the speed of the take away conveyor 190, the drum 120, or any of the films 200 and 300. The encoder 430 is in electrical communication with the controller 420 to provide the controller 420 with data regarding the speed. The laser 410a/410b may be positioned stationary with respect to the moving films 200 or the drum 110. The controller 420 may time the laser 410a/410b to intermittently pulse the laser 410a/410b as the film 200 moves past a focus point of the laser 410b or the drum 110 rotates under the laser 410a. The controller 420 may be electronically linked to sensors or additional encoders that monitor the movement of the film or the belt carrying the water soluble packets 50. The controller 420 times the pulses from the laser 410a/410b to impact the base film 200 at the appropriate interval.

Any of a variety of lasers may be used with the system 10 and the processes described herein. One suitable laser for the laser 410a/410b is a commercially available laser as Model 3320 from Videojet Technologies, Inc. of Wood Dale, Ill. This laser is a 30 watt $CO_2$ laser.

The laser 410a/410b and/or the controller 420 may be programmed to modulate any of a number of parameters and attributes of the laser pulses, for example, the timing of the laser pulses, the frequency of the laser pulses, the shape of the laser pulse, the pattern of the laser pulses, the area of coverage of the laser pulses, etc. The laser 410a/410b and/or the controller 420 may include user-input controls, such as a touch screen, keyboard, etc.

The laser 410a/410b may simultaneously emit an array of pulses that simultaneously forms multiple openings 90. For example, the laser 410a may be configured to simultaneously form openings 90 in the base film 200 covering multiple rows 142 and groups 144 of the cavities 130 of the drum 110. Likewise, the laser 410b may be configured to simultaneously form openings 90 across a web of the base film 200 in multiple columns and rows. For example, the laser 410b may be configured to simultaneously form openings 90 across a portion of the base film 200 that is approximately 24 inches wide by approximately 0.25 to 1 inches deep. For example, the laser 410b may be configured to simultaneously form openings 90 in a base film 200 covering approximately 12 cavities 130 of the drum 110. Further, multiple lasers 410 may be used together to fully cover a width of the drum 110 or the film 200.

The lid film 300 and base film 200 may be a water soluble film, such as a polyvinyl alcohol (PVA) film. The films dissolve with contact of water or other fluids. The films may have a thickness of approximately 1 millimeter to approximately 5 millimeter. Such films are commercially available from Monosol of Merrillville, Ind. Other water soluble films for forming the water soluble packets 50 may include any water-soluble, film-forming polymer, copolymer, or mixtures of such polymers. The polymers may include vinyl polymers, including homopolymers and copolymers, having functionality rendering the polymers water-soluble, such as hydroxyl and carboxyl groups. Typical water-soluble polymers include at least one of polyvinyl alcohol, partially hydrolyzed polyvinyl acetate, polyvinyl pyrrolidone, alkyl celluloses such as methylcellulose, ethylcellulose, propylcellulose and derivatives thereof, such as the ethers and esters of alkyl celluloses, and acrylic polymers such as water-soluble polyacrylates, polyacrylamides, and acrylic maleic anhydride copolymers. Suitable water-soluble polymers further include copolymers of hydrolyzed vinyl alcohol and a nonhydrolyzable anionic comonomer.

In FIGS. 2 and 7, the openings 90 are formed by the sprayer 413, which sprays the water mist onto the base layer 70. The water mist dissolves the base layer 70 to form the openings 90. The sprayer 413 may include a spray bar with one or more nozzles. The nozzles may be spaced along a width of the spray bar. The sprayer 413 may include any of a variety of nozzles, dispensers, or misters that emit fluid. The sprayer 413 is in fluidic communication with a water supply, such as a tap or other reservoir. The sprayer 413 may also spray other solvents or solutions that dissolve the openings 90 into the base layer 70. The controller 420 and the encoder 430 may be integrated with the sprayer 413. The controller 420 may be programmed to direct the sprayer 413 to continually or intermittently spray the fluid onto the base film 200.

In FIG. 3, the openings 90 are formed by the mechanical piercing member 416. For example, the mechanical piercing member may include the roller 416 with the plurality of pins 418 that physically poke the openings 90 into the base film 200. The roller 416 may include the pins 418 spaced along a width of the roller 416 in order to perforate a width of the base film 200. The roller 416 may be positioned proximate to the base film supply roll 220 such that the roller 416 forms the openings 90 while the base film 200 is still on the base film supply roll 220. The length of the pins 418 may be adjusted to control the depth of the perforating action of the roller 416. The distance between the roller 416 and the base film supply roll 220 may also be adjusted to control the depth of the perforating action of the roller 416. In other aspects, the roller 416 may be positioned between the base film supply roll 220 and the base film roller 230 to perforate the base film 200. The controller 420 and the encoder 430 may be integrated with the roller 416. The controller 420 may be programmed to continually or intermittently operate the roller 416.

In other aspects, the mechanical piercing member may include linear member, such as a plate or bar with a plurality pins. The linear member may reciprocate back and forth from the base film supply roll 220 or the base film 200 to poke the openings 90 into the base film 200.

Although the methods, systems, and assemblies described above are described with respect to laundry and dishwashing water soluble packets, the methods, the system 10, and/or the laser assembly 400 may be used to form water soluble packets 50 containing any of a variety of products, such as, for example, powders, granules, or other solid compositions for any application, such as, for example, herbicides, fertilizers, lawn chemicals, rinse-aids, cleaners, etc.

In addition to the packet forming assembly 100, one or more lasers, sprayers, or mechanical piercing members may also be used with or integrated into horizontal form fill seal machines and/or vertical form fill seal machines in order form openings to vent the water soluble packets. Horizontal form fill seal machines and vertical form fill seal machines are also used to make water soluble packets. As with other aspects, the openings provide for the compacting of the product in the water soluble packets.

Figure 10:
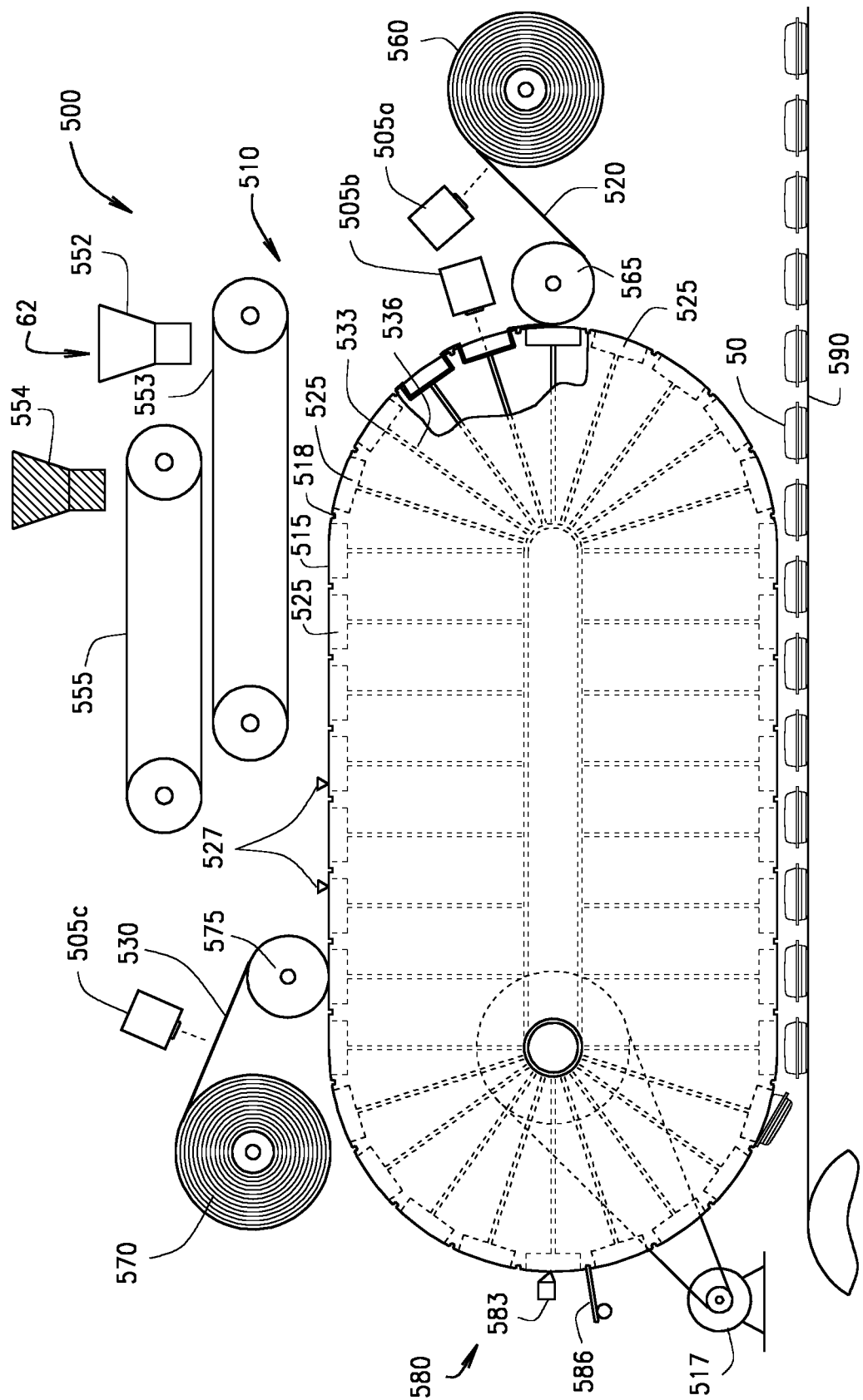
FIG. 10 is a perspective view of the horizontal form fill seal machine incorporating the laser.

FIG. 10 is a schematic view of a laser-assisted water soluble packet forming system 500 using lasers 505a and 505b with a horizontal form fill seal machine 510. Likewise, a sprayer or mechanical piercing member may be incorporated into the system 500. The system 500 includes an endless belt 515 operatively engaged to a motor 517 for movement of the endless belt 515. The packet forming assembly 500 forms the water soluble packets 50. The endless belt 515 includes a plurality of cavities 525. A bulk amount of the first product 62 is placed in a first feed hopper 552, which is generally positioned above a first conveyor 553. As the endless belt 515 moves, the first conveyor 553 meters an amount of the first product 62 into the cavities 525 on top of a base film 520. A second feed hopper 554 supplies a second conveyor 555 with the second product 64. The second conveyor 555 meters an amount of the second product 64 on top of the first product 62. Wipers 527 are positioned between the conveyors 553 and 555 to remove and/or clear extra product from the belt 515 in order improve sealing. A lid film 530 is sealed to the base film 520, and the water soluble packets 50 are separated. The base film 520 is directed to the endless belt 515 from a base film supply roll 560. A base film roller 565 presses the base film 520 against the endless belt 515. The lid film 530 is directed to the endless belt 515 from a lid film supply roll 570. A lid film roller 575 presses the lid film 530 against the base film 520. The endless belt 515 includes multiple rows of the cavities 525. Generally, a surface 518 of the endless belt 515 is covered with the cavities 525. The cavities 525 include a vacuum opening 533 that is in fluidic communication with a vacuum passage 536. The packet forming assembly 500 includes a cutting assembly 580 to separate the water soluble packets 50 from each other. The cutting assembly 580 may include a vertical cutter 583 to make vertical separation cuts and a horizontal cutter 586 to make horizontal separation cuts. In other aspects, a punch press may be used to separate the water soluble packets 50. After the water soluble packets 50 are separated, the endless belt 515 drops the water soluble packets 50 onto a take away conveyor 590.

The lasers 505a and 505b may be integrated with the packet forming assembly 500 in any of a variety of configurations or positions. Although FIG. 10 shows the use of multiple lasers, only one of the lasers 505a and 505b needs to be employed. For example, the laser 505a may form the openings 90 in the base film 520 before the base film 520 reaches the endless belt 515. The laser 505b may form the openings 90 when the base film 520 is over or drawn into the cavities 525.

The system 500 may also include the controller 420 to program and/or modulate any of a number of parameters and attributes of the laser pulses. The system 500 may also include the encoder 430 to register and time the pulses from the lasers 505a and 505b to strike the films or packets at the appropriate interval and time.

Figure 11:
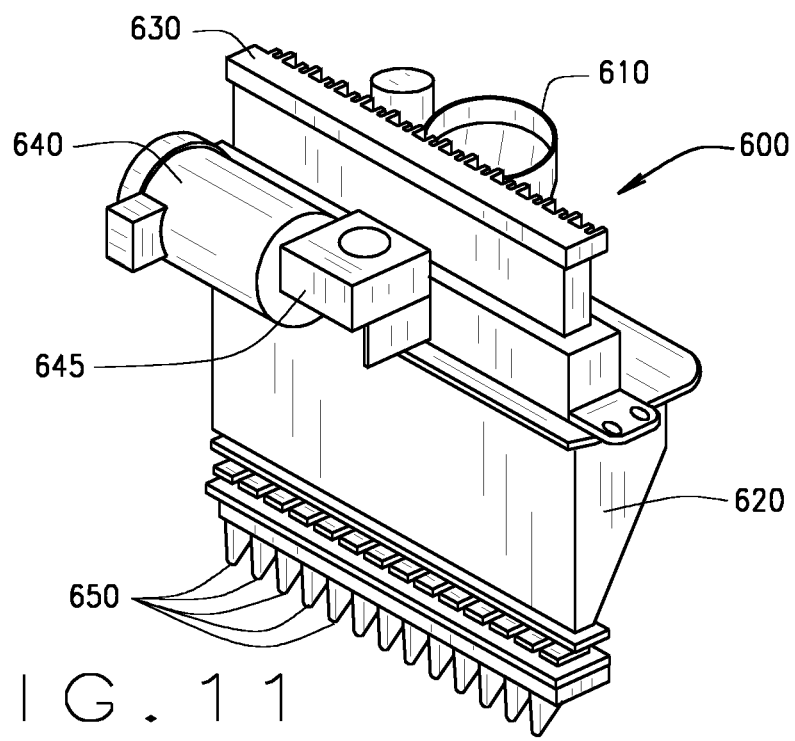
FIG. 11 is a perspective view of the auger fill assembly.
Figure 12:
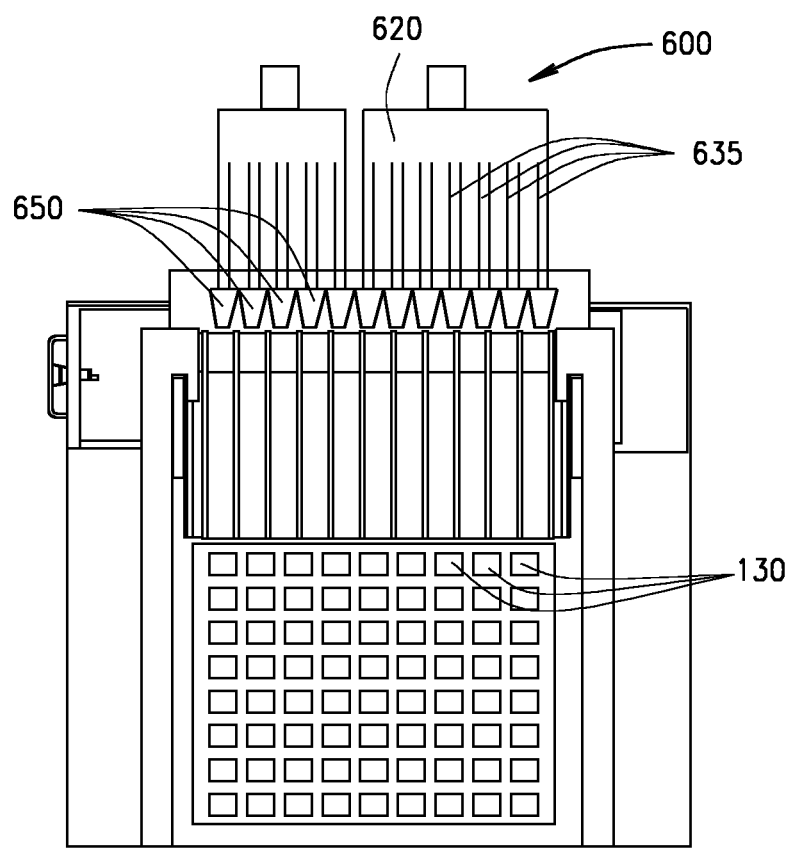
FIG. 12 is a view of the auger fill assembly over the plurality of cavities.
Figure 13:
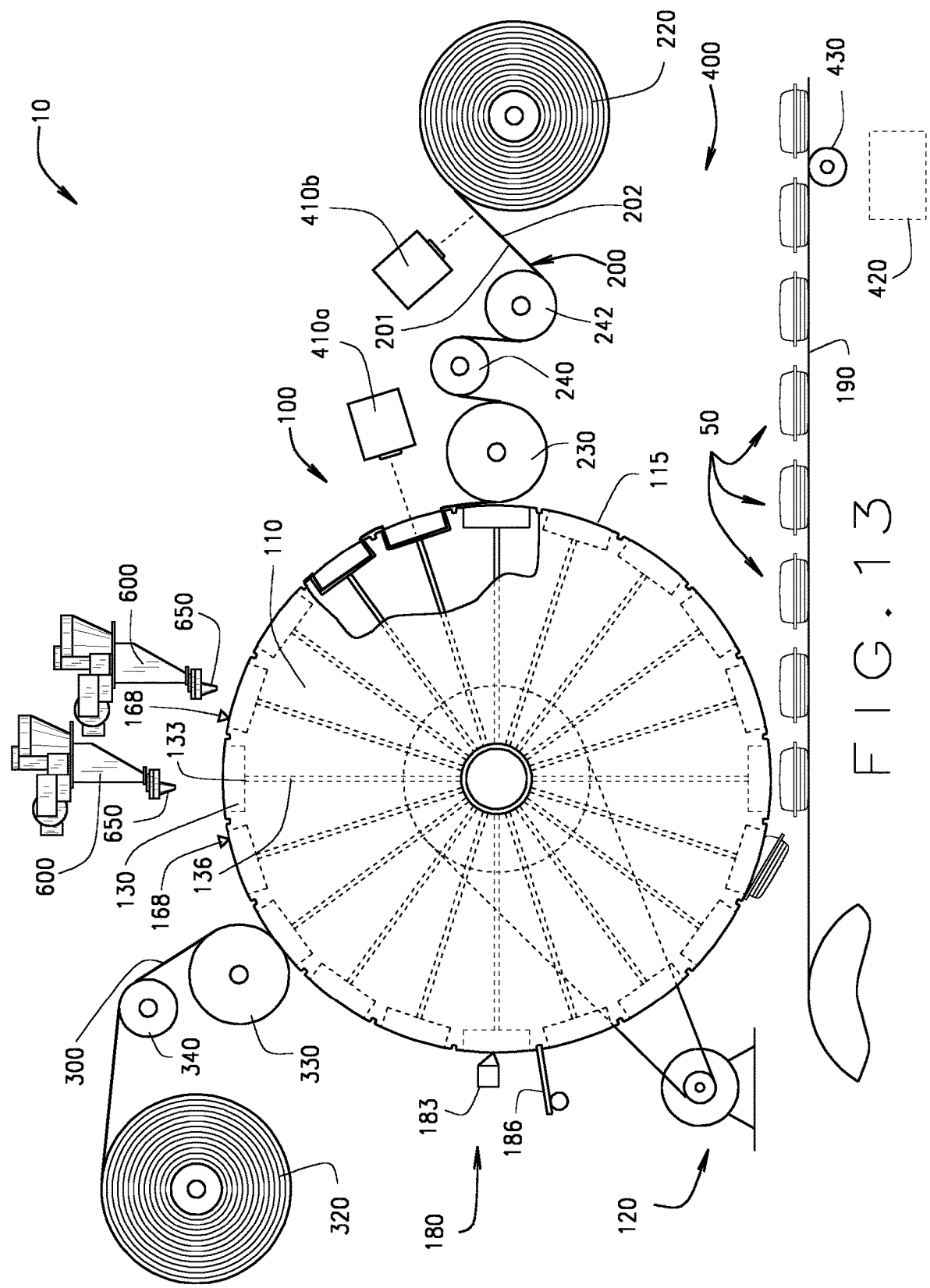
FIG. 13 is a perspective view of the auger fill assembly over the drum system.
Figure 14:
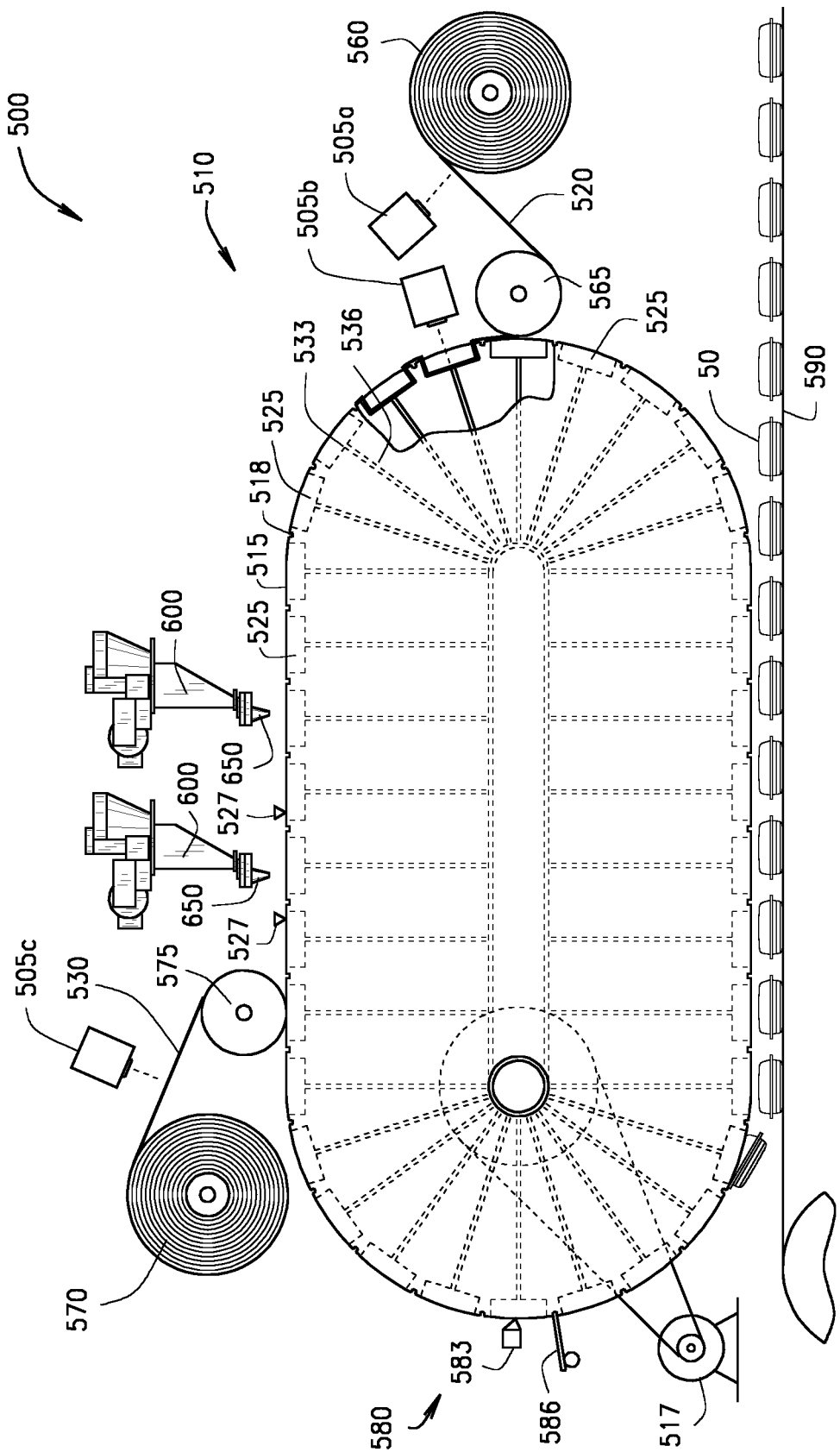
FIG. 14 is a perspective view of the auger fill assembly over the horizontal form fill seal machine.

With reference to FIGS. 10 and 11, an auger fill assembly 600 is shown. As shown in FIG. 13, two auger fill assemblies 600 may be incorporated into the packet forming system 10. As shown in FIG. 14, two auger fill assemblies 600 may be incorporated into the packet forming system 500.

The auger fill assembly 600 includes an infeed opening 610 to load product. The infeed opening 610 leads to a hopper 620 that holds the product. Independent servo motor 630 drives augers 635 inside of the assembly 600. The assembly 600 may also include an internal stirring device driven by a motor 640 and gearbox 645. A lower end of the assembly 600 includes a plurality of funnels 650 that feed the cavities 130. Generally, the assembly 600 includes a funnel 650 for each cavity 130 in the row. For example, if the cavities 130 are provided in rows of twelve, then the assembly 600 may include twelve funnels 650 to fill the cavities 130. As shown in FIGS. 13 and 14, two similar auger fill assemblies 600 are incorporated into each of the packet forming systems 10 and 500, with each auger fill assembly 600 providing a different product.

What is claimed is:

1. A system for forming dual layer water soluble packets, comprising:
   a plurality of cavities operatively engaged to a motor for moving the cavities;
   a base film supply roll configured to supply a base film to cover the plurality of cavities;
   a laser to form openings in the base film;
   a vacuum source to draw the base film into at least one cavity of the plurality of cavities and
   draw air through the openings in the base film;
   a first product feeder for metering an amount of a first product of a first color onto the base film in the at least one cavity;
   a second product feeder for metering an amount of a second product of a second color onto the amount of the first product
   a lid film supply roll to supply a lid film onto the base film; and
   a lid film roller for sealing the lid film to the base film.

2. The system according to claim 1 comprising a drum, a belt, a flat-bed, or platens configured to move the cavities.

3. The system according to claim 1, wherein the openings in the base film are formed by the laser before the base film is drawn into the cavity.

4. The system according to claim 1, wherein the openings in the base film are formed by the laser after the base film is drawn into the cavity.

5. The system according to claim 1, wherein the openings are formed by the laser after the base film has been stretched into the at least one cavity and before the amount of the first product is metered onto the base film in the at least one cavity.

6. The system according to claim 1 wherein the laser comprises a 30-watt $CO_2$ laser.

7. The system according to claim 1 wherein the density of the first product and the second product are increased by drawing air through the openings.

8. The system according to claim 1, wherein the first color and the second color are different.

9. The system according to claim 1 wherein the first product and the second product are compacted in the base film in the cavity.

10. A packet forming assembly for forming dual layer water soluble packets, comprising:
    a plurality of cavities operatively engaged to a motor for moving the cavities;
    a base film supply roll configured to supply a base film to cover the plurality of cavities;
    a laser to form openings in the base film;
    a vacuum source configured to apply vacuum to the lower side of the base film to draw the base film into at least one cavity of the plurality of cavities and;
    draw air through the openings in the base film;
    a first product feeder meter for metering an amount of a first product onto an upper side of the base film in the at least one cavity while applying the vacuum to the lower side of the base film; and
    a second product feeder meter for metering an amount of a second product onto the amount of the first product while applying the vacuum to the lower side of the base film.

11. The packet forming assembly according to claim 10 wherein a density of the first product and the second product are increased by the vacuuming.

12. The packet forming assembly according to claim 10 wherein air is drawn through the openings while metering the first product and the second product.

13. The packet forming assembly according to claim 10 wherein the openings in the base film are formed by the laser before the base film is drawn into the cavity.

14. The packet forming assembly according to claim 10 wherein the openings in the base film are formed by the laser after the base film is drawn into the cavity.

15. The packet forming assembly according to claim 10, further comprising a lid film supply roll to supply a lid film to the plurality of cavities; and a lid film roller for sealing the lid film to the base film.

16. The packet forming assembly according to claim 10, further comprising a drum, a belt, a flat-bed, or platens configured to move the cavities.

17. The packet forming assembly according to claim 10, wherein the laser comprises a 30-watt $CO_2$ laser.

18. The packet forming assembly according to claim 10, wherein the first product comprises a first color and the second product comprises a second color and the first color and the second color are different.

19. The packet forming assembly according to claim 10, further comprising compacting the first product and the second product in the base film in the cavity.

20. The packet forming assembly according to claim 10, further comprising forming a boundary between the first product and the second product.

21. A system for forming dual layer water soluble packets, comprising:

A laser configured to forming openings in a base film;

a vacuum source configured to apply a suction force to draw the base film into a cavity of a mold;

a first product feeder configured to deposit an amount of a first product of a first color onto a first side of the base film in the cavity while applying the suction force to a second side of the base film;

a second product feeder configured to meter an amount of a second product of a second color onto the amount of the first product while applying the suction force to the second side of the base film; and a lid film roller configured to seal a lid film to the first side of the base film;

wherein the openings are formed by the laser after the base film has been stretched into the cavity and before the amount of the first product is deposited onto the first side of the base film in the cavity.

* * * * *